Figure 1:
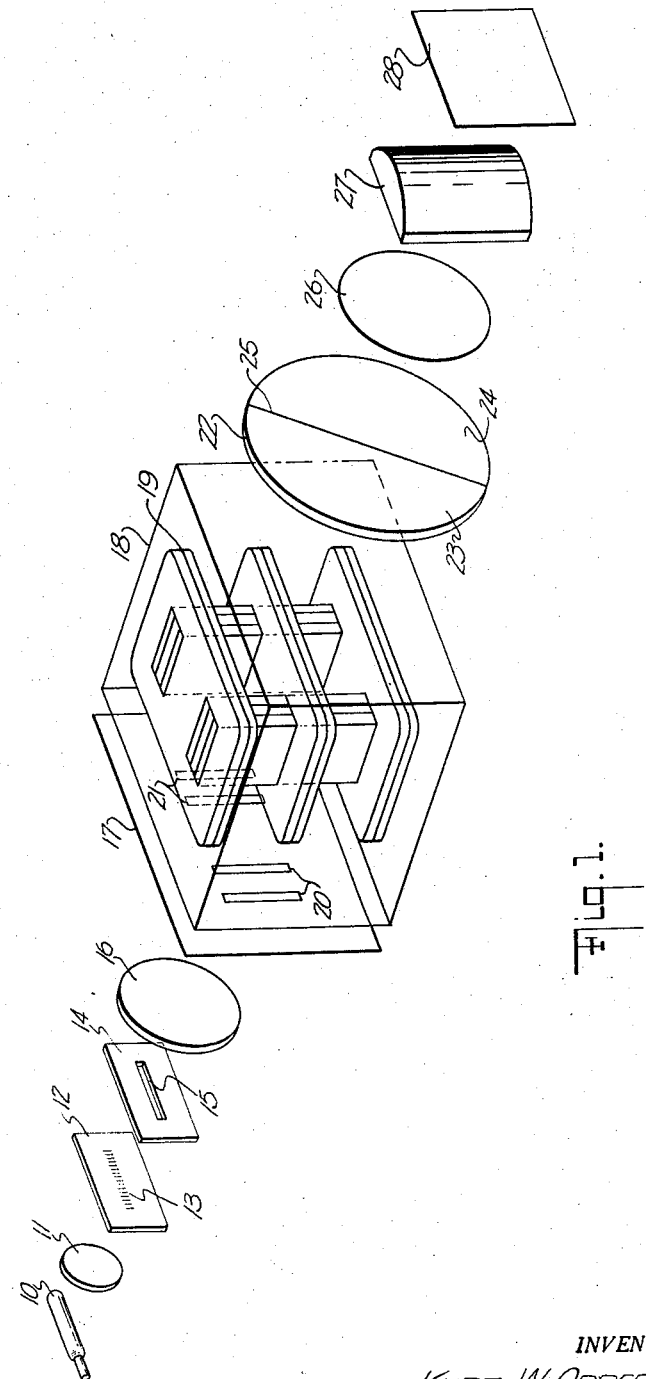

Sept. 9, 1958  K. W. OPPERMAN  2,850,940
DEVICE TO MEASURE REFRACTIVE INDEX GRADIENT
Filed April 28, 1955  2 Sheets-Sheet 1

INVENTOR.
KURT W. OPPERMAN
BY
ATTORNEY

2,850,940
Patented Sept. 9, 1958

2,850,940

DEVICE TO MEASURE REFRACTIVE INDEX GRADIENT

Kurt W. Opperman, Stamford, Conn., assignor to The Perkin-Elmer Corporation, Norwalk, Conn., a corporation of New York Application April 28, 1955, Serial No. 504,473

12 Claims. (Cl. 88—14)

The present invention is concerned with a system for deriving a measure of refractive index. More particularly, it is directed to producing interference fringes indicating the refractive index gradient of a substance under investigation, combined with a pattern representing the derivative of the index simultaneously superimposed thereon.

The precise determination of refractive indices and refractive index gradients, particularly in solutions containing boundary layers, has proved a most helpful technique in scientific investigations and research. Physico-chemical analyses often make use of accurate measurements of refractive indices to evaluate one or more other properties of the substance under study, such as concentration, temperature, pressure, etc.

The measurement of electrophoretic phenomenon is a typical instance of a physico-chemical problem where the present invention may be advantageously employed. In accordance with the teachings of Tiselius, the characteristic properties of ion species may be discerned by electrophoresis and significant conclusions may be drawn as to the nature of the solution undergoing investigation. Electrophoresis is used in the study of a wide variety of solutions including protein solutions such as blood serum.

The Foucault-Toepler-Schlieren method first adapted to electrophoresis by Tiselius, but varied and improved by others, has been widely used to produce an optical pattern which is the first derivative of refractive index gradients existing in a column of the substance under investigation.

In electrophoresis apparatus, the substance under investigation is usually a liquid mixture, but it is apparent, of course, that the optical systems used to provide a measure of refractive index gradient are not necessarily limited to electrophoresis apparatus applications, nor to the measurement of refractive index gradients within a liquid column.

The measurement of refractive index by methods involving the interference of light has long been appreciated as being sensitive and precise. As suggested by Philpot and Cook, the Schlieren-type electrophoresis optical system may be adapted to produce Rayleigh interference fringes which are characteristic of the refractive index gradient of the liquid under study.

Prior art electrophoresis apparatus has made provision for photographically recording both the derivative pattern and the Rayleigh fringes produced by the same column of liquid. Usually these two optical indicia are sequentially photographed upon different portions of the same film. One variation of the basic form of optical system customarily used in electrophoresis apparatus has been developed by which it is possible to produce a portion of the Rayleigh fringes terminating along a boundary, the contour of the boundary varying as the derivative of the refractive index. That particular prior art combination of optical apparatus affords the production of limited interference fringes combined with a form of derivative pattern as contained in the contours of the varying boundary of the interference fringes. One of the more significant advantages of that arrangement over older systems is that the measure of refractive index gradient and its derivative are both produced at the same time and may be simultaneously viewed or recorded by photographing the patterns, for instance.

Though it represents a significant contribution to the art, that particular combination of apparatus does not offer a full field of interference fringes because the derivative pattern is a boundary formed by masking the full field of interference fringes as a function of the derivative of the refractice index gradient. The lack of full field interference fringes is therefore an inherent characteristic of the system imposing necessary limitations upon the usefulness of the patterns thus produced because it is sometimes desirable to be able to trace a single fringe line from its beginning to end in order to refer all measurements to that same fringe line. The interference fringes produced by that particular type of apparatus end abruptly at the boundary contour which defines the derivative and, therefore, because of the very nature of the combined patterns, generally lack such desired continuity.

The present invention has as its primary object the simultaneous production of a full field of interference fringes indicative of the refractive index gradient, with a refractive index derivative pattern superimposed thereon.

Another object of the present invention is the production by optical means of a reliable baseline for reference purposes.

Additional objects and features of the present invention will appear from the descriptions of its operation which follow and from an understanding of its principles of operation in the novel combination disclosed.

In accordance with the present invention, an optical element which retards the light passing through one half of its field by 180° with respect to the light passing through the other half-field is used in place of the diagonal slit, wire, or knife edge of prior art arrangements. The transparent plate as employed in the novel combination of the present invention allows the interfering wavefronts to pass therethrough while the linear boundary of the half-field oriented in diagonal disposition produces a first derivative pattern; light which is not refracted by the substance under investigation coacts with the diagonal half-field boundary to produce a reliable and meaningful baseline reference for the derivative pattern.

It should be appreciated that while the optical systems discussed herein, including the present invention, have been mentioned largely in terms of their application to electrophoresis apparatus for illustrative and comparative purposes, they are not inherently limited to uses in such apparatus, and the present invention may be advantageously used in any instance where the measurement of refractive index is involved.

Figure 2:
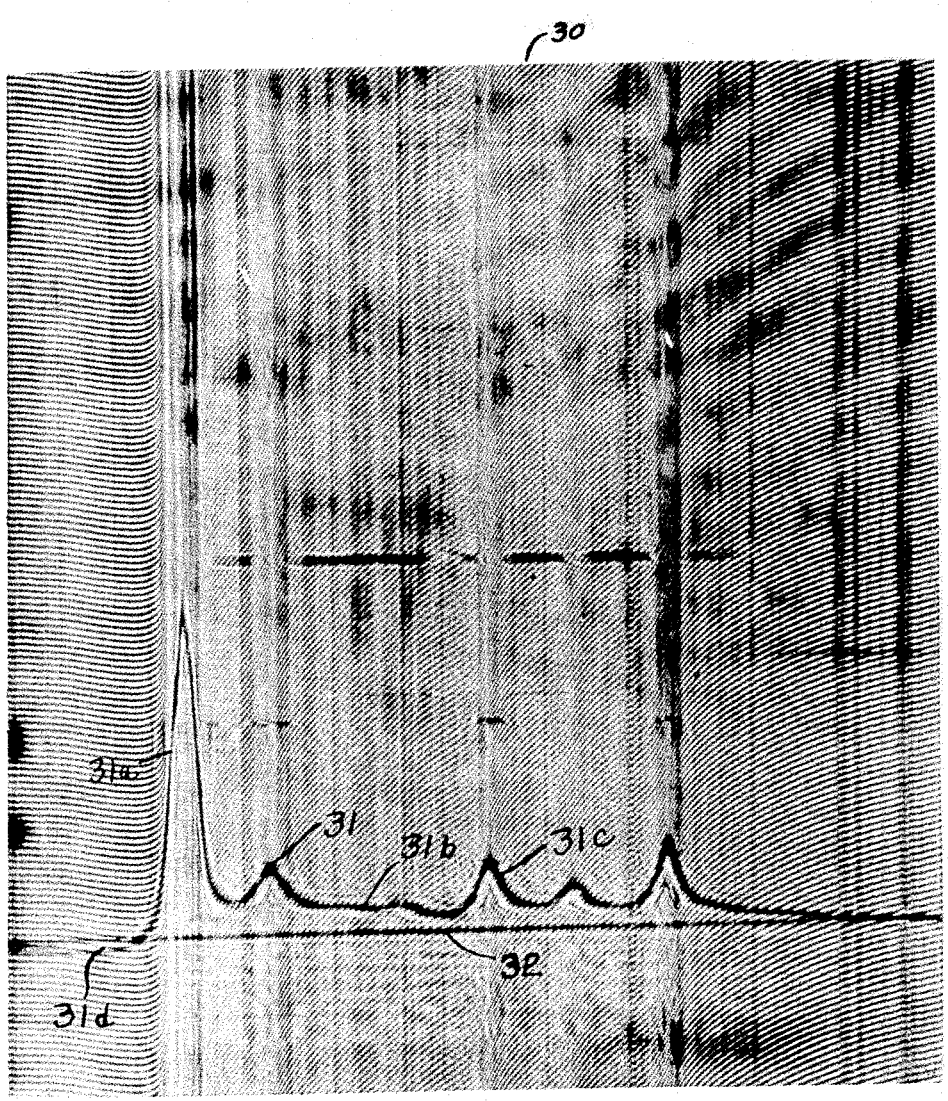

A better understanding of the invention and its operation may be had from the drawings in which:

Fig. 1 is an isometric schematic illustration of an embodiment of the present invention, Fig. 2 is an illustration of a typical measure of refractive index comprising interference fringes and the first derivative of refractive index gradient superimposed thereon together with its own reference baseline.

Since electrophoresis apparatus affords a typical application of the present invention, Fig. 1 illustrates the essential elements of such an embodiment to facilitate explanation of the principles of operation of the present invention in one of its most readily understandable practical forms.

A source of light 10, such as a mercury vapor lamp, produces monochromatic rays which are condensed by an appropriate lens 11 and concentrated upon grating 12 having a plurality of spaced, narrow, vertical apertures through which the monochromatic light may pass. For reasons which will appear more fully hereinafter, the grating spaces should be identical with the spacing between interference fringes at the image plane. The light emerging from the optical grating 12 therefore constitutes a multiple source of coherent beams. These beams fall upon a substantially opaque mask 14 having a horizontal slit opening at 15. The beams are then transmitted through a collimating lens 16 so that narrow beams of collimated light are formed.

In the electrophoresis apparatus illustrated, a Tiselius type cell 19 is shown immersed in a bath 18 which is usually theromstatically controlled. The thermostating means may be any of a number of suitable controls known in the art. This particular portion of Figure 1 including the bath 18 having transparent walls, the Tiselius cell 19, and the mask 17 is distinctly associated with electrophoretic apparatus and is used for illustrative purposes only, the fundamental concepts of the present invention being broadly applicable to other types of measurement of refractive index.

The narrow beams of coherent light collimated by lens 16 strike opaque material of a mask 17 which has two pairs of vertical slits at 20 and 21. Each pair of vertical slits 20 and 21 in mask 17 is associated and used in conjunction with one of the two columns of the Tiselius cell 19. The two columns of the cell are joined by a bottom section forming a U-tube and, when an electrical potential is applied across the cell, customarily, two columns of the Tiselius cell 19 form a plurality of refractive index boundary gradients after the strata are defined by electrophoretic phenomenon, while the bath medium adjacent the column is of substantially uniform refractive index. In usual operation, one of the pairs of slits 20 or 21 is completely masked by opaque means so that the optical pattern produced by the apparatus is indicative of the conditions prevailing in only one of the other of the two columns in the Tiselius cell 19.

Because refractive index may vary significantly due to temperature change, it is desirable that the substance being examined be kept at a uniform temperature. This may be accomplished in one of many ways, ordinarily depending upon the type of substance under investigation. In the apparatus schematically illustrated in Fig. 1, a bath 18 containing a thermostatically controlled liquid of substantially the same order of refractive index as the liquid under examination in the Tiselius cell 19, serves to maintain a stable temperature condition for accurate refractive index measurement.

The monochromatic light passing through the substance under investigation is deflected in accordance with the refractive index and falls upon the half-field, 180° phase plate 22. This plate may be an optical flat one half of which 24 is thicker than the other half 23. The difference in optical thickness between the two half fields is equal to one-half wavelength of the monochromatic light used in the apparatus. The difference in optical thickness may be achieved in a number of ways; for instance, by coating one half-field of the plate with a film of transparent material having an appropriate thickness.

The light waves passing through one half of the plate 22 are retarded in phase by 180°, the 180° phase designation being in relation to and dependent upon the particular wavelength of the monochromatic light source employed in the apparatus. The difference of optical path lengths of the light therefore produces interference fringes of a familiar type which vary in accordance with the refractive index variations of the substance being investigated.

The boundary 25, defining the difference in thickness of the two halves of the plate 22, lies in a plane parallel to the horizontal slit 14 but is oriented diagonally with respect to the principal axis of the horizontal slit 14.

The diagonal orientation of the boundary line 25 in combination with an astigmatic lens systems such as the cylindrical lens 27, produces a pattern representative of the first derivative of the refractive index ($dn/dx$) of the substance under investigation. A photographic lens 26 interposed between the half-field 180° phase plate 22, and the astigmatic lens 27, facilitates recording the interference fringes and derivative pattern on the same photographic film 28.

Additionally, the light passing through a reference medium adjacent the Tiselius cell coacts with the light passing through the medium being investigated and the diagonally disposed boundary line to produce a second $dn/dx$ curve which is a straight line because the refractive index is constant throughout the bath medium adjacent the cell. This provides a convenient, reliable and meaningful baseline to which the derivative pattern may be referred.

Other forms of the 180° light phase shifting means may be employed with the combination of the present invention. For instance, a single transparent plate may be ground and polished so as to be thicker by the proper amount on one half of its field, or two half-field plates of different thicknesses may be cemented together. Yet another variation may be had by grinding and polishing a plate having one half of its field at a slightly different angle than the other half. Two slightly inclined plane parallel plates rotatable about axes parallel to the intersection of their planes can also be employed, the intersection of the planes being diagonally oriented in accordance with the concept and teaching of the present invention. It will be readily appreciated that phase changes of any odd number of half wavelengths will produce comparable results.

Fig. 2 is a reproduction of a typical photographic record of the interference fringes and derivative patterns which may be produced by an electrophoresis apparatus embodying the present invention. The interference fringes are full field continuous lines which traverse the entire area designated generally at 30 and each line may be traced from beginning to end. Superimposed thereon is the derivative curve 31 and it may be clearly seen that the derivative curve throughout its length corresponds to each rate of change of the refractive index as represented by the interference fringes 30, i. e., where the refractive index is increasing as indicated by the interference fringes, that portion of the derivative superimposed thereon shows a correlated increase as may be seen at 31a; where the refractive index is substantially constant, that portion of the derivative pattern superimposed thereon is substantially unchanged in amplitude as shown at 31b; where the refractive index is decreasing, that portion of the refractive index superimposed thereon shows a correlated decline such as seen at 31c, for example.

It should be observed that the baseline 32 produced by the novel combination of the present invention provides a reliable reference for all measurements of the derivative curve. This is most useful and further enhances the accuracy of derivative measurements. As may be readily seen, such measurements cannot be reliably referenced to a baseline drawn between any two arbitrarily chosen points, such as the two lowest points of the derivative curve, for instance, as was customarily done in order to interpret information contained in patterns produced by some prior art apparatus.

The superior reliability of the reference baseline produced by apparatus operating in accordance with the teaching of the present invention is strikingly evident in Fig. 2. In the extreme lefthand portion of Fig. 2 it will be noted that the gradient of refractive index is fundamentally different from the remainder of the pattern in that the slope of the interference fringes is negative in that portion and changes decreasingly. As a consequence, the first derivative of the slope appears below the reference baseline at 31d. Prior art systems could not provide such clear and reliable indication of a negatively decreasing slope in relation to their typically masked reference baseline. Comparison of the patterns and baseline provided by the present invention with those of the prior art readily demonstrates the advantages of the patterns provided by the present invention.

The simultaneity of the several indices provides by the present invention, (i. e., the gradient of refractive index, the first derivative of the gradient, and the reference baseline), is an especially important feature of the present invention when the medium under investigation undergoes a change in refractive index with time. Completely instantaneous and simultaneous recording of these several indices may be readily effected by a single photographic exposure, for instance, of the combined pattern produced by the present invention.

Moreover, the derivative pattern and baseline produced by the present invention are much more clearly defined in location and amplitude variation than the relatively obscure boundary patterns of prior art devices. It is to be noted also that the derivative pattern produced by apparatus operating in accordance with the present invention is of constant thickness and does not vary as a function of the rate of change of the derivative pattern as had many such patterns produced by prior art systems. These features are, of course, in addition to the more basic advantages of the present invention by which both the interference fringes and derivative patterns are simultaneously produced.

The features of full field interference fringes, with a clearly defined derivative curve and reliable baseline reference simultaneously superimposed thereon are not to be found in prior art optical systems. The use of diagonal wire, slit or knife edge as taught in optical systems in the prior art each have contributed some advancement, but none is capable of producing the combined desirable features afforded by the present invention.

Since many changes could be made in the specific combination of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

I claim:

1. An optical system for deriving a measure of refractive index gradient comprising a source of substantially monochromatic light, opaque means having a slit for passing light from said source therethrough, means for positioning the medium to be examined in the path of the light emerging from said slit, a half-field 180° phase plate positioned to transmit the light emerging from said medium, said plate having the boundary of its half field in a plane parallel to that of said slit and oriented diagonally thereto, and an astigmatic lens systems positioned to transmit the light passing through said plate, whereby interference fringes are produced as a function of the refractive index gradient of said medium with a pattern of the first derivative of said index simultaneously superimposed thereon.

2. An optical system for deriving a measure of refractive index gradient comprising means for producing a plurality of coherent beams of collimated monochromatic light and directing said beams through the medium being examined, a half-field 180° phase plate positioned in the path of the light emerging from said medium, said plate having the boundary of its half field in a plane normal to the rays of said collimated beams and disposed diagonally thereto and an astigmatic lens system positioned to transmit the light passing through said plate, whereby interference fringes are produced as a function of the refractive index of said medium with a pattern of the derivative of said index simultaneously superimposed thereon.

3. An optical system for deriving a measure of refractive index gradient comprising a source of substantially monochromatic light, slit means for passing light from said source therethrough, means for positioning the medium to be examined in the path of the light emerging from said slit, a half-field 180° phase plate positioned in the path of the light emerging from said medium and having the boundary of its half field in a plane parallel to that of said slit and oriented diagonally thereto, and an astigmatic lens system positioned to transmit the light passing through said plate, whereby full field interference fringes are produced as a function of the refractive index gradient of said medium with a pattern of the derivative of said index simultaneously superimposed thereon.

4. An optical system for deriving a measure of refractive index gradient comprising a source of substantially monochromatic light, slit means for passing light from said source therethrough, means for collimating the light issuing from said slit means, means for positioning the medium to be examined in the path of said collimated light, a half-field 180° phase plate positioned to transmit the light emerging from said medium, said plate having the boundary of its half field in a plane parallel to that of said slit means and oriented diagonally thereto, and an astigmatic lens system for transmitting the light issuing from said plate, said lens having its optical axis in a plane parallel to that of said opaque means, but rotated 90° with respect to the slit axis, whereby full field interference fringes are produced as a function of the refractive index gradient of said medium with a pattern of the derivative of said index simultaneously superimposed thereon.

5. An optical system for deriving a measure of refractive index gradient comprising a source of substantially monochromatic light, slit means for passing light from said source therethrough, means for collimating said light in a plurality of coherent beams, means for positioning the medium to be examined in the path of a portion of said collimated light, a half-field 180° phase plate positioned to transmit all the light emerging from said medium, said plate having the boundary of its half field in a plane substantially parallel to that of said slit means and oriented diagonally thereto, and an astigmatic lens system for transmitting the light issuing from said plate, said lens system having its optical axis in a plane parallel to that of said slit means, but rotated 90° with respect to the axis of said means, whereby interference fringes are produced as a function of the refractive index gradient of said medium with a pattern of the derivative of said index simultaneously superimposed thereon in relation to a baseline created by that portion of said collimated light which does not pass through said medium.

6. An optical system for deriving a measure of the refractive index gradient of liquid, comprising a source of substantially monochromatic light, slit means for passing light from said source therethrough, a cell containing said liquid and positioned in the path of the light emerging from said slit means, a half-field 180° phase plate positioned to transmit the light emerging from said cell, said plate having the boundary of its half field in a plane substantially parallel to that of said slit means and oriented diagonally thereto, and an astigmatic lens system positioned to transmit the light passing through said plate, whereby interference fringes are produced as a function of the refractive index gradient of said liquid with a pattern of the derivative of said index simultaneously superimposed thereon.

7. An optical system for deriving a measure of refractive index gradient comprising a source of substantially monochromatic light, slit means for passing light from said source therethrough, means for positioning the medium to be examined in the path of the light emerging from said slit means, a half-field 180° phase plate positioned to transmit the light emerging from said medium, said plate comprising an optical flat having one half of a surface coated with a transparent film optically equal in thickness to substantially one-half wavelength of said monochromatic light, the boundary of said film being oriented diagonally to said slit means, and an astigmatic lens system positioned in the path of the light emerging from said plate, whereby interference fringes are produced as a function of the refractive index gradient of said medium with a pattern of the derivative of said index simultaneously superimposed thereon.

8. An optical system for deriving a measure of refractive index gradient comprising a source of substantially monochromatic light, slit means for passing light from said source therethrough, means for positioning the medium to be examined in the path of the light emerging from said slit means, a half-field 180° phase plate positioned to transmit the light passed through said medium, said plate comprising an optically flat glass element having one half of a surface coated with a film of transparent material of substantially the same refractive index as said glass and one-half wavelength of said monochromatic light in thickness, the boundary of said film being oriented diagonally to said slit means, and an astigmatic lens system positioned in the path of the light emerging from said plate, whereby interference fringes are produced as a function of the refractive index gradient of said medium with a pattern of the derivative of said index simultaneously superimposed thereon.

9. An optical system for deriving a measure of refractive index gradient comprising a source of substantially monochromatic light, slit means for passing light from said source therethrough, means for positioning the medium to be examined in the path of the light emerging from said slit means, means for controlling the temperature of said medium, a half-field 180° phase plate positioned to transmit the light passed through said medium, said plate having the boundary of its half field in a plane parallel to that of said slit means and oriented diagonally thereto, and an astigmatic lens system positioned to transmit the light passing through said plate, whereby interference fringes are produced as a function of the refractive index gradient of said medium with a pattern of the derivative of said gradient simultaneously superimposed thereon.

10. An optical system for deriving a measure of the refractive index gradient of a liquid comprising a source of substantially monochromatic light, slit means for passing light from said source therethrough, a cell containing said liquid and positioned in the path of the light emerging from said slit means, a liquid bath surrounding said cell, the refractive index of said liquid bath being substantially of the order of said liquid being examined, a half-field 180° phase plate positioned to transmit the light passed through said cell and bath, said plate having the boundary of its half field in a plane substantially parallel to that of said slit means and oriented diagonally thereto, and an astigmatic lens system positioned to transmit the light passed through said plate, whereby interference fringes are produced as a function of the refractive index gradient of said liquid under examination with a pattern of the derivative of said index simultaneously superimposed thereon.

11. An optical system for deriving a measure of refractive index comprising means for producing a narrow planar beam of collimated light and directing said beam through the medium being examined, a half-field 180° phase plate positioned in the path of the light emerging from said medium, said plate having the boundary of its half field in a plane normal to the rays of said collimated beam and disposed diagonally to said beam's principal cross-sectional dimension, an astigmatic lens system positioned to transmit the light passing through said plate, and means for exposing photographic film to said light, whereby the interference fringes produced as a function of the refractive index of said medium are recorded with a pattern of the derivative of said index simultaneously superimposed thereon.

12. An optical system for deriving a measure of refractive index gradient comprising a source of substantially monochromatic light, slit means for passing light from said source therethrough, means for positioning the medium to be examined in the path of the light emerging from said slit means, a half-field 180° phase plate positioned to transmit the light emerging from said medium, one part of said plate having an optical thickness effective to shift the light passing therethrough by 180° relative to the light passing through its remaining portion, and having the boundary of said portions oriented diagonally to said slit means, and an astigmatic lens system positioned in the path of the light emerging from said plate, whereby interference fringes are produced as a function of the refractive index gradient of said medium with a pattern of the derivative of said index simultaneously superimposed thereon.

References Cited in the file of this patent
UNITED STATES PATENTS

| 2,712,265 | Inglestam | July 5, 1955 |
| 2,792,743 | Wiedermann | May 21, 1957 |

FOREIGN PATENTS

| 819,925 | Germany | Nov. 5, 1951 |
| 295,132 | Switzerland | Dec. 15, 1953 |